April 17, 1962 — A. I. APPLETON — 3,030,130
FITTING FOR FLEXIBLE CONDUIT
Filed June 16, 1958 — 2 Sheets-Sheet 1
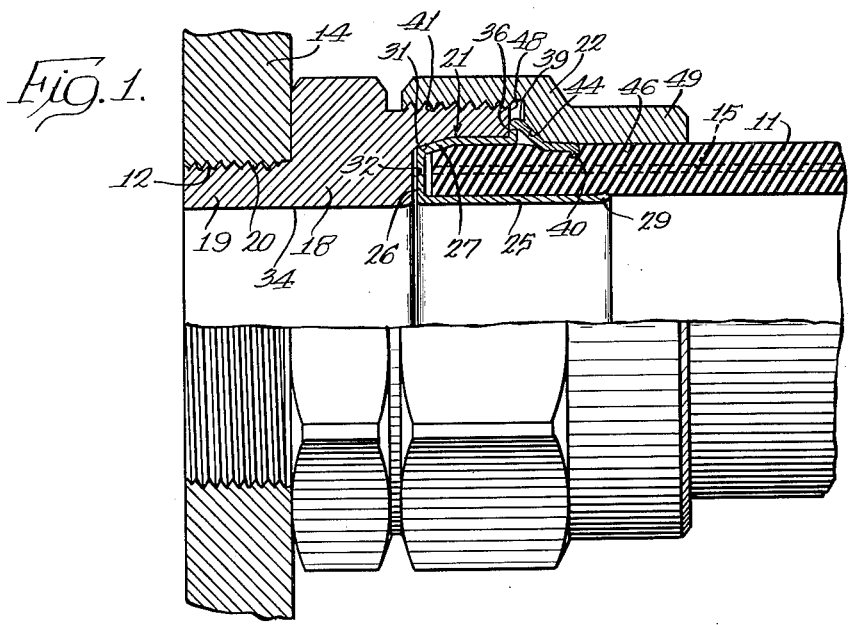
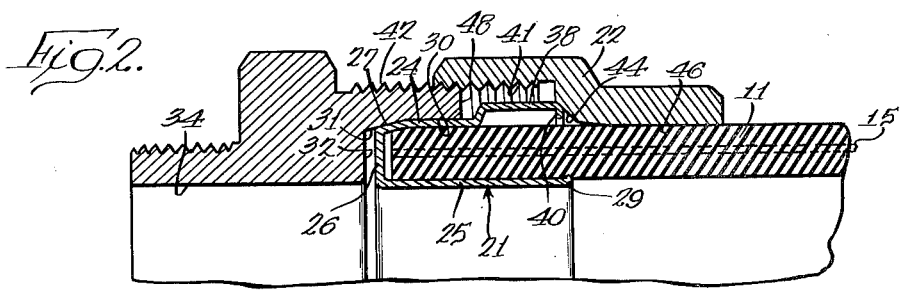
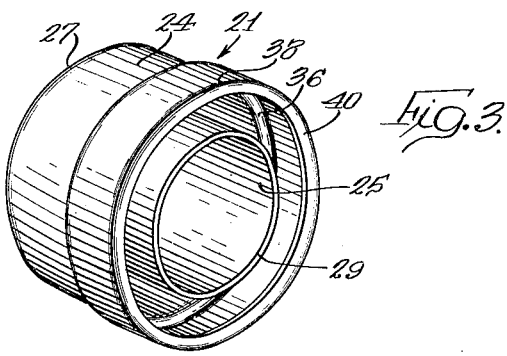
INVENTOR.
Arthur I. Appleton
BY
Carlson, Pitzner, Hubbard & Wolfe
Attys.

April 17, 1962 A. I. APPLETON 3,030,130
FITTING FOR FLEXIBLE CONDUIT
Filed June 16, 1958 2 Sheets-Sheet 2
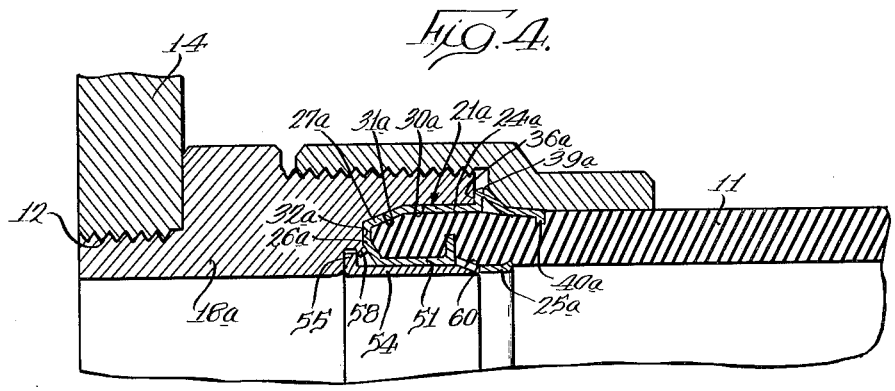
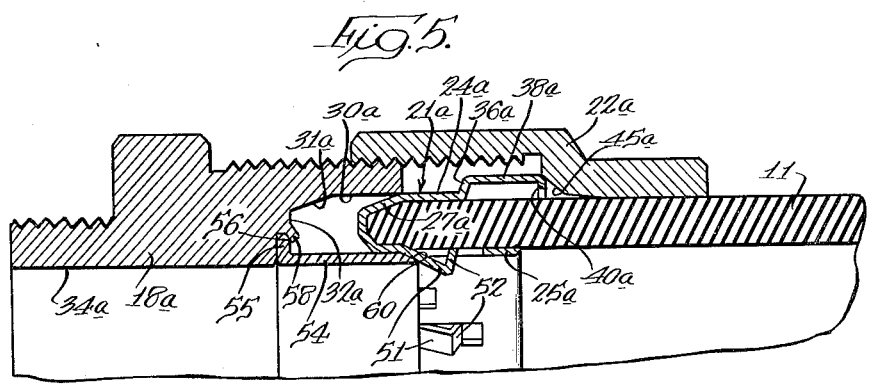
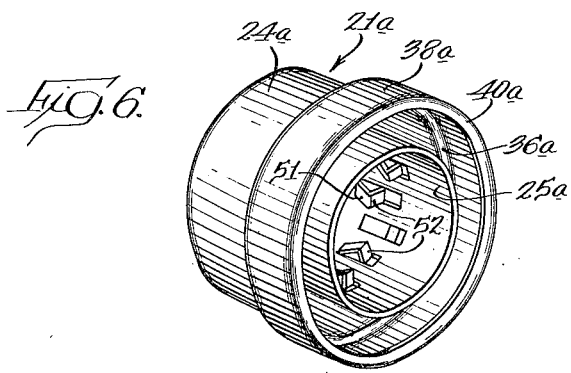
INVENTOR.
Arthur I. Appleton
BY
Carlson, Pitzner, Hubbard & Wolfe
Attys.

3,030,130
FITTING FOR FLEXIBLE CONDUIT
Arthur I. Appleton, Northbrook, Ill. (% Appleton Electric Co., 1713 Wellington Ave., Chicago 13, Ill.)
Filed June 16, 1958, Ser. No. 742,368
1 Claim. (Cl. 285—248)

The present invention relates to fittings for flexible conduit and more particularly to fittings for use with yieldable resilient conduit such as rubber and plastic hose or tubes and is concerned with separable fittings including essentially a body attachable to a fixture, a thimble for receiving an inserted end of the conduit and for anchoring the conduit securely within the body, and a sealing nut for squeezing the thimble tightly to the tubing and into sealing engagement within the body.

It is the general aim of the present invention to provide a new and improved flexible conduit fitting which affords strong, secure and leak-proof couplings yet which is economically and readily manufactured. Another object is to provide a coupling for flexible conduit which is easily utilized and requires no particular skill for assembly.

A further object is to provide a fitting of the foregoing characteristics which securely grips the conduit even under stresses and vibrations and prevents the conduit from being blown out of the fitting at high pressures. Still a further object is to provide a flexible conduit fitting of the above type which accommodates to slight variations in tubing diameters.

Other objects and advantages will become apparent as the following description proceeds taken in connection with the accompanying drawings wherein:

FIGURE 1 is an elevation view partly in section, of a fitting constructed in accordance with the present invention and having a conduit secured therein.

FIG. 2 is a sectional view showing the parts making up the fitting before they have been tightly secured together.

FIG. 3 is a perspective view of a thimble embodying the present invention and forming a part of the fitting shown in FIG. 1.

FIG. 4 is a sectional view illustrating a modified form of coupling and conduit secured therein.

FIG. 5 is a sectional view of the modified coupling shown in FIG. 4 before the parts are tightly secured together.

FIG. 6 is a perspective view of a modified thimble used in the coupling of FIG. 4.

While certain illustrative conduit fittings have been shown in the drawings and will be described below in considerable detail, it should be understood that there is no intention to limit the invention to the specific forms disclosed. On the contrary the intention is to cover all modifications, alternative constructions, equivalents and uses falling within the spirit and scope of the invention as expressed in the appended claim.

The conduit fittings shown in the drawings to illustrate the present invention, are especially adapted for securing yieldable resilient flexible conduit 11 in an aperture 12 through a box wall 14 or the like. The flexible conduit is formed of one of numerous materials commonly employed for forming flexible conduit such as rubber, neoprene, polyethylene, Teflon and the like. If desired, the tubing may be reinforced with wires 15 wound spirally within its walls.

Referring to FIGS. 1 and 2, the fitting there shown comprises a hollow body 18 of tubular or sleeve like form which in this case happens to be provided with an annular end portion 19 adapted to be inserted through the aperture 12 in a wall 14 and held therein by threads 20 or any other suitable means.

For receiving an inserted end of the conduit 11 within the body 18 and for anchoring the same therein tightly and securely so that it is capable of resisting axial pull-out forces, the fitting includes a ferrule or thimble indicated generally as 21 (FIG. 3) which is adapted to be placed over an inserted end of the conduit and subsequently inserted into the sleeve member 18 where it is held in place and sealed to both the conduit 11 and the body 18 by a sealing nut 22. The thimble comprises a thin brass cap-like member which is generally annular in shape and includes an outer sleeve portion 24 for surrounding the flexible conduit 11 and snugly against the inner wall thereof. The outer sleeve portion 24 of the thimble is joined to the inner sleeve portion by a radially extending annular end portion or web 26 which includes a rearwardly tapering wedge portion 27 on its outer end joined to the outer sleeve portion 24 and generally overlying the inner sleeve portion 25. If desired, the free end of the inner sleeve portion 25 may be slightly flared for gripping the inner wall surface of the tube. Thimbles fabricated from rolled brass have been found satisfactory although any suitable light gauge metal material may be employed.

For receiving the thimble, the body 18 is formed with a counterbore 30 having an inwardly tapering seat 31 terminating in an abrupt radial shoulder 32. The counterbore 30 and tapering seat 31 communicate directly with the main bore 34 of the body as defined by the annular portion 19 but are of substantially larger diameter than the bore 34.

The thimble is readily attached to the free end of a flexible conduit by simply inserting the inner sleeve 25 into the end of the conduit after the sealing nut 22 which attaches to the fitting body 18 is slipped over the end of the conduit. No advance special preparation end need be made, the thimble 21 being susceptible of readily receiving and engaging the end of the conduit.

In accordance with one aspect of the present invention, the thimble affords an enhanced fluid-tight seal between the fitting and the conduit when the sealing nut is tightened on the body regardless of variations in the outside diameter of the conduit. To this end, the outer sleeve 24 is formed with a radially outwardly extending shoulder 36 integral with an enlarged annular sleeve portion 38 surrounding the inner sleeve 25 and adapted to be deformed against the conduit 11 to form a sealing ridge 39 or lip (FIG. 1) when the sealing nut is tightened in place. At its outer end the enlarged annular sleeve 38 is formed with an inwardly directed flange 40 for biting into the surface of the conduit 11 when the sealing nut is tightened against the sleeve 38. For forming the ridge 39, the sealing nut 22 is provided with internal threads 41 adapted for engagement with external threads 42 on the body surrounding the counterbore 30 and seat 31. The threads 41 run axially of the nut to an intermediate point which may, for example, be a runout groove 44 for the threading tool. Between the threads 41 and the outer end of the nut, that is the end of the nut remote from the body, the nut is formed with a relatively heavy tapered internal shoulder 44 decreasing somewhat abruptly in diameter toward the outer end of the nut. Between the shoulder 44 and the outer end, the nut defines a bore 46 of the nut which makes a comfortable sliding yet snug fit with the conduit 11.

As the nut 22 is tightened on the body 18, the tapered shoulder 45 exerts a progressive radially inward force and a simultaneous axial squeeze on the annular sleeve portion 38. This squeezing action deforms the sleeve 38 radially inwardly against the conduit 11 so that the radial flange 40 bites into the conduit surface. Additionally, the sleeve portion 38 is formed into the radially extending ridge or lip 39 by a sort of spinning action, and this rib 39 is forced tightly against the exposed annular face 48 of the body 18. As the rib 39 is forced towards the body, tightening of the nut exerts a thrusting action on the thimble tending to wedge the tapered web portion 27 snugly against the tapered seat 31 in the body. An effective two-point seal is thereby provided, both at the point of engagement between the thimble and the body and at the point of contact of the rib 39 with the body end 48.

To protect the conduit from tearing in the event of severe flexure in the vicinity of the fitting, the nut 22 is formed with an axially extending sleeve portion 49 integral with the end of the nut remote of the body and defining the bore 46. This sleeve portion makes a comfortable but snug sliding fit with the outer surface of the conduit and in so doing provides a support which effectively resists lateral deflection of the conduit in the vicinity of the seal.

To adapt the fitting for use with higher pressures which might tend to force the conduit out of the thimble, a modified form of fitting is provided which embodies locking members for positively holding the conduit within the fitting. The modified form is shown in FIGS. 4, 5 and 6 and in describing this modification similar reference characters will be used where applicable with the distinguishing suffix "a."

For securely and positively gripping a conduit, there is provided a ferrule or thimble 21a having an inner sleeve member 25a, an outer sleeve member 24a joined to the inner sleeve by means of a radially extending web portion 26a including rearwardly tapering web portion 27a overlying the inner sleeve 25a.

For positively gripping the conduit in order to hold the conduit in the fitting under high pressures, the thimble is formed with gripping means in the shape of claws or lugs 51 struck radially inwardly from the inner sleeve 25a and having a radially projecting tang or leg 52 adapted to be driven into the inner wall of the conduit 11a. The claws are integrally attached to the thimble, and once the claws are driven into the conduit, the latter is securely locked within the thimble.

For forcing the claws into the conduit there is provided in the body 18a an inner annular body sleeve 54 extending generally concentrically within the counterbore 30a and defining an extension of the main bore 34a. The body sleeve 54 thus provided defines an annular counterbore which is adapted to receive the thimble 21a. As described above, the counterbore 30a is formed with an abrupt shoulder 32a and an inwardly tapering seat 31a against which the inclined web portion 27a of the thimble is wedged.

While the inner body sleeve 54 may be formed integrally with the body, it is shown as a separate annular sleeve member having an outwardly directed radial flange 55 secured in a groove 56 in the shoulder 32a between the body bore 34a and the counterbore 30a by an offset flange 58.

The outer sleeve of the thimble 21a is formed as described above, that is, with an annularly enlarged sleeve portion 38a joined to the outer sleeve by a shoulder 36a. As the clamping nut 22a is tightened, a tapered shoulder 45a thereon engages the annularly enlarged thimble sleeve portion 38a and deforms it radially towards the conduit and axially to form an annular ridge or rib 39a (FIG. 4), and forces an annular flange 40a on the outer end of the sleeve to bite into the outer surface of the conduit.

At the same time, the thimble is gripped to the conduit as the inner sleeve portion is tightly wedged into the annular counterbore defined in the body by the bore 30a and the sleeve 54. The counterbore has an internal diameter slightly greater than the internal diameter of the sleeve 25 so that the latter is tightly wedged therein. This wedging force, in addition to compressing the end of the conduit 11a, forces the claws 52 to dig into the conduit surface. Not only is the conduit then held securely in place by the claws 52, but being compressed, as shown in FIG. 4, the chance of leakage under fluid pressure between the conduit and the thimble is substantially eliminated. Insertion of the thimble into the annular counterbore defined in the body by the counterbore 30a and the sleeve 54 is facilitated by a tapering surface 60 on the outer end of the sleeve 54 and by making the end of the inner thimble sleeve 25a adjacent the web 26a of a slightly enlarged diameter. The thimble can then be readily inserted in the annular counterbore as shown in FIG. 5. Since the modified thimble 21a is formed with a flange 40a tightly wedged against the outer face of the body and with an inclined portion 27a tightly wedged against a correspondingly tapered seat 31a in the body 18a, and the conduit 11 is severely compressed as well as gripped by the claws 51 within the thimble, an extremely high pressure fitting joint is provided.

The conduit gripping structure illustrated in FIGS. 4, 5 and 6 and described in detail above is described and claimed in my copending application Serial No. 742,367, filed June 16, 1958.

I claim as my invention:

A fitting adapted for attachment to the free end of a yieldable resilient conduit comprising, in combination, a sleeve-like body having a main bore, a counterbore at one end thereof terminating in an annular end surface, a tapered seat in said body situated between said bore and said counterbore and tapering inwardly from the counterbore towards the main bore, external threads on said body disposed in surrounding relation with the counterbore and said inwardly tapered seat, an annular thimble adapted to fit over the free end of the conduit and having an inner sleeve adapted for insertion into the conduit along the inner peripheral wall thereof and an outer sleeve disposed in radially spaced surrounding relation with said inner sleeve, one end portion of said outer sleeve closely surrounding said conduit and fixed to said inner sleeve, a radially extending annular shoulder intermediate the ends of said outer sleeve, the other end portion of said outer sleeve defining an enlarged diameter annular sleeve extending from the outer edge of said shoulder and terminating in an inwardly directed radial annular flange, said thimble being adapted to fit initially into said body with said outer sleeve extending through said counterbore and into contact with said tapered seat, an annular sealing nut having threads engaging said external threads on said body, said nut having an elongated sleeve on the end thereof remote from said body defining a bore for receiving and supporting said conduit, and a tapered internal shoulder in said nut decreasing in diameter toward said sleeve end, said tapered shoulder being of suitable diameter to engage said enlarged annular sleeve and deform the same axially into an outwardly extending narrow annular ridge projecting between said nut shoulder and said annular body end surface so that said thimble shoulder abuts said annular body end surface and at the same time squeeze the end flange radially inwardly into the conduit and squeeze a portion of the enlarged sleeve inwardly towards the conduit so that a substantial portion of said sleeve is deformed to lie tightly against the conduit between the conduit and the nut while the remaining portion of the sleeve is deformed into a radially projecting shoulder extending between said nut and said body, all of the foregoing parts being constructed and arranged so that tightening of said nut on said body forms said ridge and produces an axial thrust on said thimble forcing said thimble into sealed relation with said tapered seat.

References Cited in the file of this patent

UNITED STATES PATENTS 172,470    Morse _____ Jan. 18, 1876

(Other references on following page)

UNITED STATES PATENTS

| | | | |
|---|---|---|---|
| 1,136,226 | Glauber | Apr. 20, | 1915 |
| 2,008,650 | Weatherhead | July 16, | 1935 |
| 2,216,839 | Hoffman | Oct. 8, | 1940 |
| 2,228,018 | Scholtes | Jan. 7, | 1941 |
| 2,251,716 | Parker | Aug. 5, | 1941 |
| 2,314,000 | Lusher | Mar. 16, | 1943 |
| 2,321,260 | Stecher | June 8, | 1943 |
| 2,463,883 | Kinsey | Mar. 8, | 1949 |
| 2,469,510 | Wolfram | Feb. 7, | 1950 |
| 2,511,134 | Stranberg | June 13, | 1950 |
| 2,527,785 | Hanson | Sept. 19, | 1950 |
| 2,641,487 | La Marre | June 9, | 1953 |
| 2,648,550 | Courtot | Aug. 11, | 1953 |
| 2,768,846 | Gratzmuller | Oct. 30, | 1956 |
| 2,782,060 | Appleton | Feb. 19, | 1957 |

FOREIGN PATENTS

| | | | |
|---|---|---|---|
| 915,008 | France | July 8, | 1946 |